(12) United States Patent
Uramichi et al.

(10) Patent No.: US 7,222,919 B2
(45) Date of Patent: May 29, 2007

(54) RECLINING DEVICE AND METHOD OF LOCKING THE DEVICE

(75) Inventors: Hideki Uramichi, Toyota (JP); Taiyo Otsuka, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 64 days.

(21) Appl. No.: 10/523,275

(22) PCT Filed: Jul. 30, 2003

(86) PCT No.: PCT/JP03/09700

§ 371 (c)(1),
(2), (4) Date: Feb. 1, 2005

(87) PCT Pub. No.: WO2004/012560

PCT Pub. Date: Feb. 12, 2004

(65) Prior Publication Data

US 2005/0264076 A1    Dec. 1, 2005

(30) Foreign Application Priority Data

Aug. 2, 2002   (JP) .............................. 2002-226320

(51) Int. Cl.
*B60N 2/22* (2006.01)
*B60N 2/235* (2006.01)
(52) U.S. Cl. ...................................... 297/367; 297/366
(58) Field of Classification Search ................ 297/366, 297/367
See application file for complete search history.

(56) References Cited

U.S. PATENT DOCUMENTS

| | | | |
|---|---|---|---|
| 4,348,050 A * | 9/1982 | Letournoux et al. .... | 297/367 X |
| 4,770,464 A * | 9/1988 | Pipon et al. ................. | 297/367 |
| 5,785,386 A * | 7/1998 | Yoshida ....................... | 297/367 |
| 6,328,383 B2 | 12/2001 | Rohee et al. | |
| 6,390,557 B1 | 5/2002 | Asano | |
| 6,733,077 B2 * | 5/2004 | Asano .......................... | 297/367 |
| 6,758,525 B2 * | 7/2004 | Uramichi .................... | 297/366 |
| 6,820,937 B1 * | 11/2004 | Esaki et al. ................. | 297/366 |
| 6,910,737 B2 * | 6/2005 | Hosokawa ............... | 297/367 X |
| 7,097,251 B2 * | 8/2006 | Uramichi .................... | 297/366 |
| 2002/0043852 A1 * | 4/2002 | Uramichi .................... | 297/366 |
| 2002/0096923 A1 * | 7/2002 | Uramichi .................... | 297/366 |

FOREIGN PATENT DOCUMENTS

| | | |
|---|---|---|
| EP | 1 104 659 A1 | 6/2001 |
| EP | 1 225 086 A1 | 7/2002 |
| JP | 02-128707 | 5/1990 |

\* cited by examiner

*Primary Examiner*—Rodney B. White
(74) *Attorney, Agent, or Firm*—Patterson, Thuente, Skaar & Christensen, P.A.

(57) ABSTRACT

A reclining mechanism may have a construction in which a plurality of pawls are received in a pair of housings that are relatively rotatably connected to each other, each of these pawls being prevented from rotating relative to one of the housings and being engageable with a ratchet formed in the other of the housings, each of the pawls being moved by a spring force from a free position in which the relative rotation of the housings is permitted to a locking position in which the relative rotation of the housings is prevented by virtue of engagement of each of the pawls and the ratchet, wherein at least one of the pawls is moved prior to the other of the pawls when each of the pawls moves from the free position to the locking position.

17 Claims, 8 Drawing Sheets

RECLINING DEVICE AND METHOD OF LOCKING THE DEVICE

TECHNICAL FIELD OF THE INVENTION

The present invention mainly relates to seat reclining mechanisms for a vehicle seat and locking methods of the same

Related Art

Conventionally, such a seat reclining mechanism is taught, for example, by Japanese Laid-Open Patent Publication No. 2000-79032. In this seat reclining mechanism, a stationary housing and a rotational housing are relatively rotatably connected. The stationary and rotational housings define an inner space therebetween in which a pair of pawls and an operating cam are respectively received. Both of the pawls can radially move while they are prevented from rotating relative to the stationary housing. Also, both of the pawls have toothed portions that can engage inner toothed portions formed in an inner circumferential surface of the rotational housing. The inner toothed portions of the rotational housing will be hereinafter referred to as "ratchets."

When an operating shaft is operated so as to be rotated, the operating cam moves in a predetermined direction. When the operation of the operating shaft is discontinued, the operating cam moves in a reverse direction because of a spring force. When the operating cam moves by the spring force, the pawls radially move from an inward unlocking position to an outward locking position so that the toothed portions of the respective pawls engage the ratchets. As a result, the relative rotation of both of the housings is limited so that the reclining mechanism is configured in a locking condition.

When the pair of pawls moves from the unlocking position toward the locking position, the spring force is dispersed in half and applied to the pawls. Therefore, the engagement (locking) force between the respective pawls and the ratchets is insufficient, thereby causing so-called "tooth slippage" so that actual engagement portions are shifted one or two teeth from target engagement portions. In order to prevent this phenomenon and to increase the locking performance of the reclining mechanism, it is possible to increase the spring force. However, increasing of the spring force may result in increasing size, weight and manufacturing cost of the reclining mechanism.

DISCLOSURE OF THE INVENTION

It is one object of the present teachings to eliminate the so-called "tooth slippage" at the time that the respective pawls engage the ratchets, thereby improving the locking performance of the conventional reclining mechanism without increasing the spring force.

The invention defined in claim 1 is a reclining mechanism having a construction in which a plurality of pawls are received in a pair of housings that are relatively rotatably connected to each other, each of these pawls being prevented from rotating relative to one of said housings and being engageable with a ratchet formed in the other of said housings, each of said pawls being moved by a spring force from a free position in which the relative rotation of said housings is permitted, to a locking position in which the relative rotation of said housings is prevented by virtue of the engagement of the pawl and said ratchet, wherein at least one of the pawls is moved prior to the other of the pawls when each of said pawls moves from said free position to said locking position.

According to the utilization of such a construction, when each of the slide pawls moves by the spring force from the free position to the locking position, in its initial state, the spring force can converge on one of the slide pawls, for example, the slide pawl having a preceeding ed movement start timing. Therefore, the engagement (locking) force between one of the slide pawls and the ratchet can be increased without increasing the spring force. As a result, so-called "tooth slippage" may be eliminated so that the locking performance of the reclining mechanism can be increased.

The invention defined in claim 2 is the reclining mechanism as defined in claim 1, wherein the moving timing of each of the pawls is defined by the shape of cam portions of an operating cam. Therefore, the moving timing of each of the pawls can be changed by simply changing the shape of the cam portions without considerably changing the design of the reclining mechanism.

The inventions defined in claims 3–5 relate to aspects of the operating cam. In claim 3, said respective cam portions of the operating cam are shaped such that at least one of the pawls is moved prior to the other of the pawls. In claim 4, each of said cam portions of said operating cam in claim 3 is shaped such that when each of said pawls is moved from the free position to the locking position, the other of the pawls begin to move so as to engage the toothed portion with the ratchet before said toothed portion of one of the pawls completely engages the ratchet. In claim 5, when one of the pawls first begins to move by operating said operating cam in claim 3, a reactive force from one of said pawls is received by a guide member operationally guiding said operating cam, and the other of the pawls begin to move before the completion of the movement of one of the pawls so that a reactive force from the other of the pawls is received by one of the pawls.

The inventions defined in claims 6–10 relate to aspects of the sliding-type pawl. In claim 6, the respective cam portions of the operating cam are shaped such that at least one of the slide pawls is moved prior to the other of the slide pawls. In claim 7, the operating cam in claim 6 is a sliding-type cam, and the movement of one of the slide pawls is performed by utilizing a contacting portion of a side surface opposite to the cam portion of said operating cam interacting with said slide pawl contact portion and a guide groove wall surface of the housing slidably guiding said operating cam as a supporting point. In claim 8, the operating cam in claim 6 is a rotating-type cam, and the movement of one of the slide pawls is performed by utilizing a contacting portion of said operating cam and inner circumferential surfaces of bearing openings of the housings rotatably supporting the operating cam as a supporting point. In claim 9, each of the cam portions of the operating cam in claim 6 is shaped such that when each of the slide pawls is moved from the free position to the locking position, the other of the pawls begin to move so as to engage the toothed portion with the ratchet before the toothed portion of one of the slide pawls completely engages the ratchet. In claim 10, when one of the slide pawls first begins to move by operating the operating cam in claim 6, a reactive force from one of said slide pawls is received by a guide member operationally guiding said operating cam, and the other of the slide pawls begin to move before the completion of the movement of one of the slide pawls so that a reactive force from the other of the slide pawls is received by one of the slide pawls.

The invention defined in claim 11 is a reclining mechanism having a construction in which a plurality of pawls and an operating cam are respectively received in a pair of housings that are relatively rotatably connected to each other, each of said pawls being prevented from rotating relative to one of said housings and having a toothed portion that is engageable with a ratchet formed in the other of the housings and a contact portion that is positioned opposite to the toothed portion, said operating cam having cam portions that can respectively separately interact with said contact portions of said respective pawls, said respective cam portions separately interacting with said contact portions of said respective pawls when the operating cam is operated by a predetermined spring force so that each of the pawls is moved from a free position in which the relative rotation of said housings is permitted, to a locking position in which the relative rotation of said housings is prevented by virtue of engagement of said toothed portion and said ratchet, wherein said respective cam portions of said operating cam are shaped such that the movement start timing of one of the pawls precedes the movement start timing of the other of the pawls.

According to such a construction, when each of the slide pawls moves from the free position to the locking position by the spring force, in its initial state, the spring force can converges on one of the slide pawls having a preceding movement start timing.

In the invention defined in claim 12, each of the cam portions of the operating cam in claim 11 is shaped such that when each of said pawls is moved from a free position to a locking position, the other of the pawls timely begin to move so as to engage the toothed portion with the ratchet before said toothed portion of one of the pawls completely engages the ratchet.

In the invention defined in claim 13, when one of the pawls first begins to move by operating the operating cam in claim 11, a reactive force from one of said pawls is received by a guide member operationally guiding said operating cam, and the other of the pawls begins to move before the completion of the movement of one of the pawls so that a reactive force from the other of the pawls is received by one of the pawls.

The invention defined in claim 14 is a method constructed such that in a pair of housings that are relatively rotatably connected to each other, a plurality of pawls provided in one of the housings are radially moved by operating an operating cam due to a predetermined spring force so as to engage a ratchet formed in the other of the housings, wherein when each of said pawls is moved by virtue of operation of said operating cam from a free position in which the relative rotation of said housings is permitted, to a locking position in which the relative rotation of said housings is prevented by virtue of the engagement of the pawl and said ratchet, said operating cam moves one of the pawls by utilizing a contacting portion of said operating cam and a guide member operationally guiding the operating cam as a supporting point. And said operating cam acts on the other of the pawls before a toothed portion of one of the pawls completely engages the ratchet so that the other of the pawls begin to move toward the locking position in which a toothed portion engages the ratchet by utilizing a contacting portion of the operating cam and one of the pawls as the supporting point.

Thus, when each of the pawls moves by virtue of operation of the operating cam from the free position to the locking position in which the pawl engages the ratchet, the supporting point of the operating cam for receiving a reactive force from the pawl is successively changed so that all of the pawls can finally appropriately engage the ratchets.

Other features, advantages and various embodiments of the present invention will be readily apparent after reading the following detailed description together with the accompanying drawings.

PREFERRED EMBODIMENTS OF THE INVENTION

Hereinafter, embodiments of the present invention will be described. A first embodiment will be described with reference to FIGS. 1 to 7.

Figure 1:
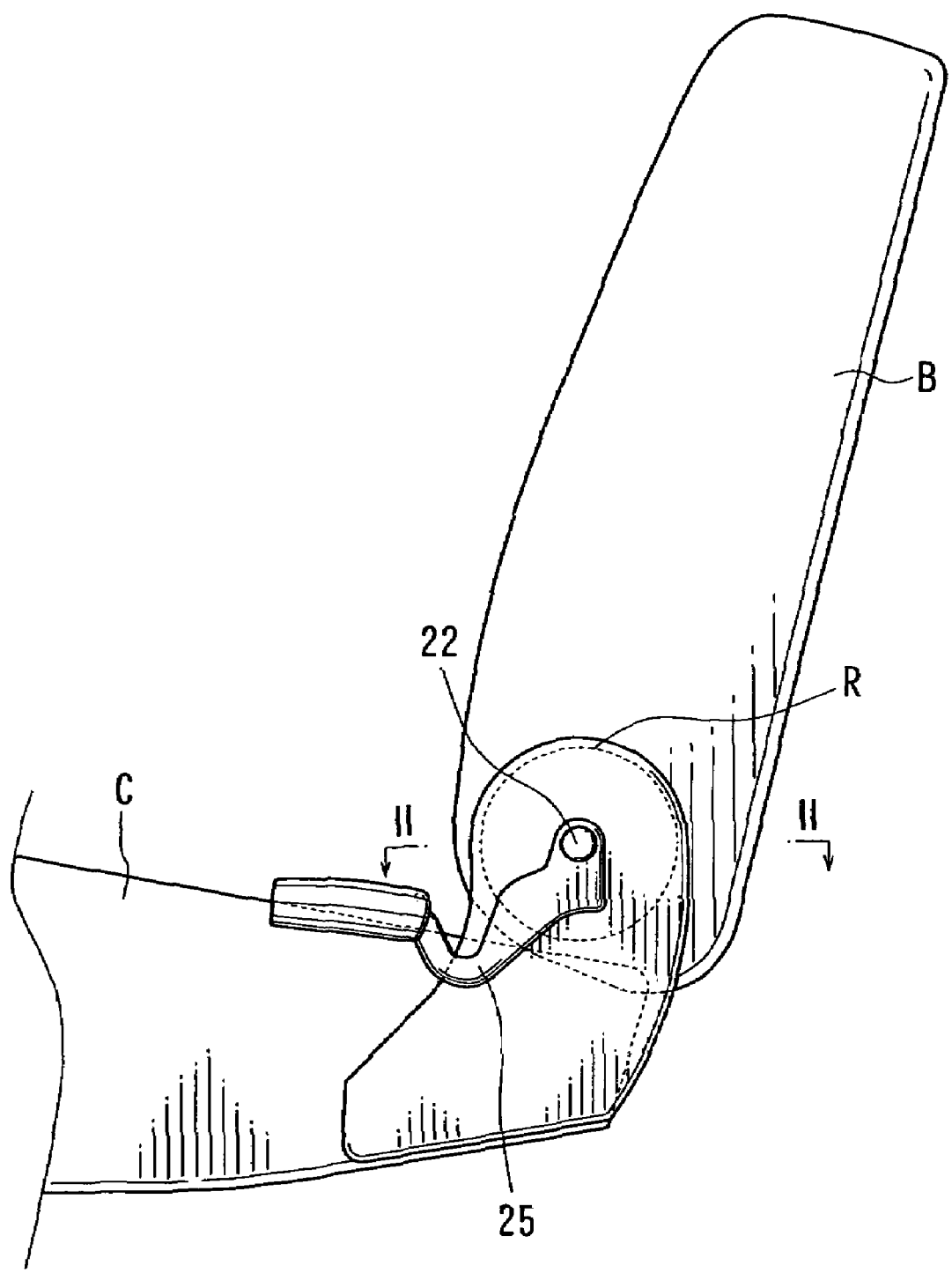
FIG. 1 is a partially omitted side view of a vehicle seat.
Figure 2:
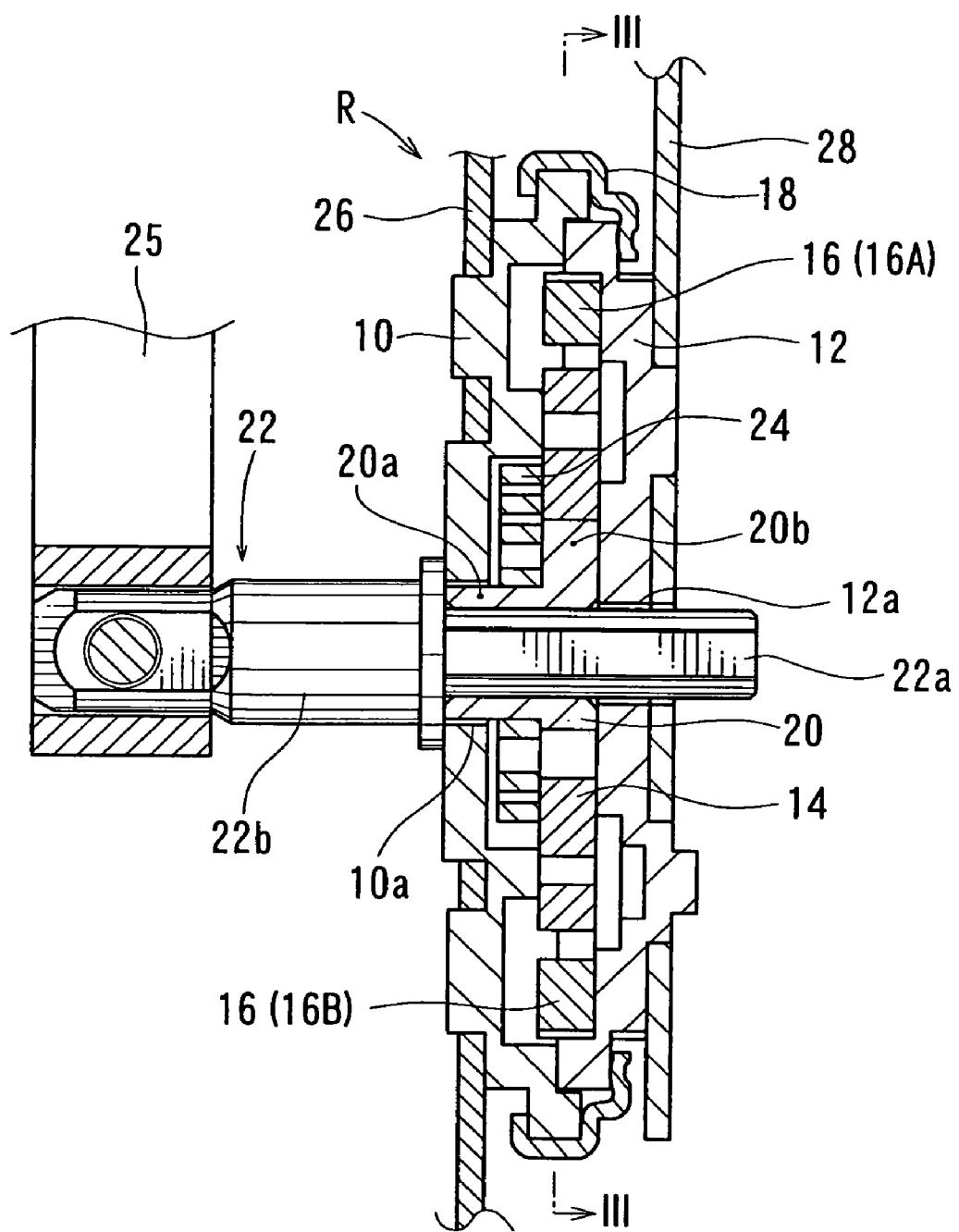
FIG. 2 is an enlarged cross-sectional view taken along line II—II in FIG. 1, which illustrates a reclining mechanism according to a first embodiment.

FIG. 1 is a partially omitted side view of a vehicle seat. FIG. 2 is an enlarged cross-sectional view taken along line II—II in FIG. 1. FIGS. 3–7 are plan views of FIG. 2 viewed along line III—III. As shown in FIG. 1, a rear end of a seat cushion C of a seat is connected to a lower end of a seat back B via a reclining mechanism R. The reclining mechanism R can be unlocked by operating an operation lever 25 so that the seat back B can be tilted back and forth around an operating shaft 22.

Figure 3:
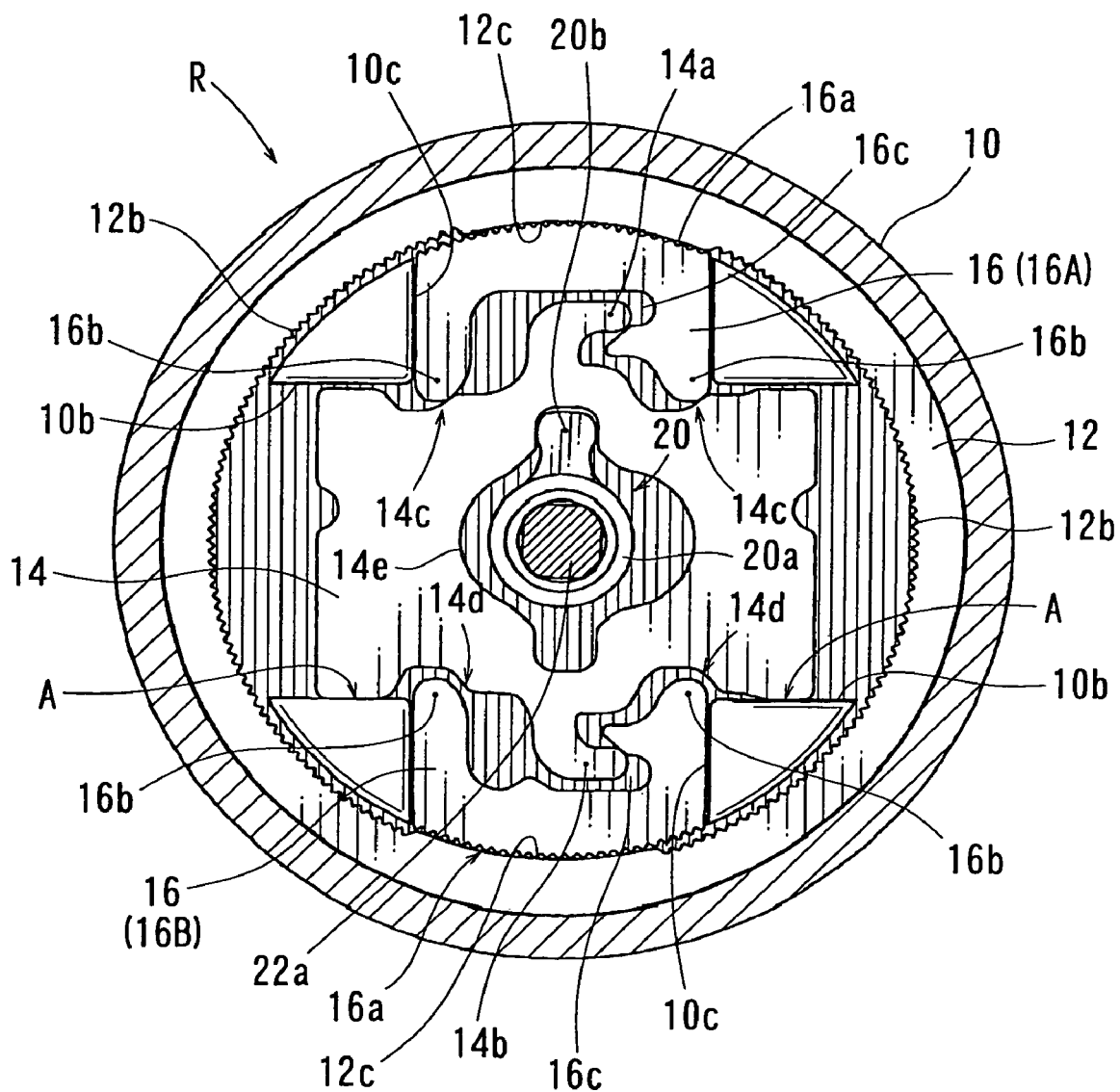
FIG. 3 is a plan view of the reclining mechanism shown in FIG. 2 viewed along line III—III.

As shown in FIGS. 2 to 3, the reclining mechanism R includes an outer shell that is constructed from a disk-shaped stationary housing 10 and a disk-shaped rotational housing 12. The housings 10 and 12 are oppositely coupled to each other and are relatively rotatably connected by clamping a clip ring 18 that is circumferentially attached thereto (FIG. 2).

The stationary housing 10 is affixed to a cushion frame 26 of the seat cushion C. The rotational housing 12 is affixed to a back frame 28 of the seat back B. The housings 10 and 12 define a inner receiving space therebetween that receives an operating cam 14, a pair of slide pawls 16 (16A and 16B), an operating member 20 and a spirally shaped spring 24 therein. These construction elements are connected to the operating shaft 22 that passes through central portions of the housings 10 and 12. They are directly connected to the shaft 22 or indirectly connected to the shaft 22 via other members. The shaft 22 has opposed ends projecting outwardly through the housings 10 and 12.

The stationary housing 10 has a receiving opening 10a that passes through the central portion thereof (FIG. 2). Also as shown in FIG. 3, the stationary housing 10 has an inner circular recessed portion in which guide grooves 10b and 10c are formed so as to perpendicularly extend vertically and horizontally. The operating cam 14 is disposed in the guide grooves 10b. The pair of slide pawls 16 (16A and a6B) are disposed in the guide grooves 10c.

The rotational housing 12 has a receiving opening 12a that passes through the central portion thereof so as to coaxially align with the receiving opening 10a (FIG. 2). Also, as shown in FIG. 3, the rotational housing 12 has an inner circular recessed portion. The recessed portion has toothed portions constituting ratchets 12b and non-toothed portions 12c. These portions are formed in an outward circumferential surface of the recessed portion. The non-toothed portions 12c are positioned in two locations of the outward circumferential surface of the recessed portion, in which the two locations are angularly spaced apart 180 degrees, so that the ratchets 12b are circumferentially spaced apart by the non-toothed portions 12c. Further, the rotational housing 12 has an outer diameter that can fit within the circular recessed portion of the stationary housing 10 when the rotational housing 12 is coupled to the stationary housing 10.

As shown in FIG. 3, the operating cam 14 is a plate having substantially a rectangular shape and has engagement projections 14a and 14b that radially project from around the central portions of opposite longer sides thereof. Also, the operating cam 14 has cam portions 14c and 14d that are respectively formed in the opposite longer sides. They are respectively positioned on both sides of the engagement projections 14a and 14b. The operating cam 14 includes a centrally located bore 14e that receives the operating member 20.

Both of the slide pawls 16 (16A and 16B) are plate members that have the same shape as each other. However, their movement start timings due to the operation of the operating cam 14 are different from one another. Therefore, with regard to the movement of the slide pawls 16, the slide pawls 16A and 16B are separately described. With regard to other points, the slide pawls 16A and 16B are generally described as the slide pawls 16.

As shown in FIG. 3, each slide pawl 16 has an arcuate shape. A slide pawl 16 has a toothed portion 16a that can engage the ratchet 12b. The toothed portion 16a is formed in a pawl top portion that is positioned in a radially outward side when the pawl 16 is assembled into the pawl guide grooves 10c. The slide pawl 16 has a pair of right and left contact portions 16b. The contact portions 16b are formed in a portion opposite to the pawl top portion, i.e., a portion that is positioned in a radially inward side when the pawl 16 is assembled into the guide grooves 10c. Each slide pawl 16 has an engagement recess 16c that is positioned between the contact portions 16b.

The operating member 20 includes a cylindrical shaft portion 20a and an arm portion 20b that outwardly projects from a circumferencial surface thereof. The arm portion 20b engages a part of the bore 14e of the operating cam 14 (FIG. 3). A part of the cylindrical shaft portion 20a is positioned in the receiving opening 10a of the stationary housing 10 (FIG. 2). A reduced diameter portion 22a of the operating shaft 22 is inserted into the cylindrical shaft portion 20a from the outside of the stationary housing 10. An inner circumferential surface of the cylindrical shaft portion 20a and an outer circumferential surface of the reduced diameter portion 22a are shaped to permit transmission of rotational motion therebetween. Further, an increased diameter portion 22b of the operating shaft 22 is positioned outside of the stationary housing 10 and has an operation lever 25 attached to its end portion.

As represented in FIG. 2, the spring 24 has a spiral shape as described above and functions as a torsion spring between the stationary housing 10 and the operating member 20. That is, the inner end of the spring 24 is connected to the outer circumferential surface of the cylindrical shaft portion 20a and the outer end of the spring 24 is connected to an inner wall portion of the stationary housing 10.

When the respective construction elements of the reclining mechanism R are assembled, the operating cam 14 is positioned in the cam guide grooves 10b of the stationary housing 10 so as to slide right and left in FIG. 3. Conversely, the slide pawls of 16 are positioned in the pawl guide grooves 10c of the stationary housing 10 so as to oppose the operating cam 14 and to radially slide without circumferentially moving. The engagement projections 14a and 14b of the operating cam 14 are respectively positioned in the engagement recesses 16c of the slide pawls 16. Also, the cam portions 14c and 14d of the operating cam 14 are positioned so as to contact or to be contactable with the contact portions 16b of the slide pawls 16.

Also, when the respective construction elements of the reclining mechanism R are assembled, the operating member 20 is biased counterclockwise in FIG. 3 by the force of the spring 24. Thus, the operating cam 14 is applied with an actuating force in a leftward direction in FIG. 3 via the arm portion 20b of the operating member 20. Further, when the operating shaft 22 is rotated about its axis, the operating member 20 moves clockwise in FIG. 3 against the force of the spring 24. At this time, the operating cam 14 is applied with an actuating force in a rightward direction in FIG. 3 via the arm portion 20b.

Operation of the reclining mechanism R will now be described.

FIG. 3 shows an unlocking or free condition of the reclining mechanism R, i.e., a condition in which the rotational housing 12 can rotate. In this condition, the slide pawls 16 are positioned such that the respective toothed portions 16a faces the non-toothed portions 12c of the rotational housing 12. Also, in this free condition, the operating shaft 22 is not applied with a rotational operating force so that the operating cam 14 is applied with the actuating force in a leftward direction in FIG. 3 by the force of the spring 24. Thus, the cam portions 14c of the operating cam 14 contact the contact portions 16b of the slide pawl 16A that is positioned at the upper side in FIG. 3, thereby radially outwardly forcing the slide pawl 16A.

As a result, the slide pawl 16A is radially restrictively positioned while the toothed portion 16a contacts the non-toothed portion 12c of the rotational housing 12. Therefore, the operating cam 14 in this condition is applied with a reactive force from the slide pawl 16A so as to be retained by wall surfaces A, positioned on one side (the lower side in FIG. 3) of the cam guide grooves 10b. In other words, the operating cam 14 radially outwardly forces the slide pawl 16A by utilizing the wall surfaces A of the cam guide grooves 10b as supporting points. Further, in this condition a narrow clearance is formed between wall surfaces positioned on the opposite side (the upper side in FIG. 3) of the cam guide grooves 10b and the operating cam 14. In addition, the cam portions 14d of the operating cam 14 are not contacting the contact portions 16*b* of the slide pawl 16B that is positioned at the lower side of FIG. 3.

Figure 4:
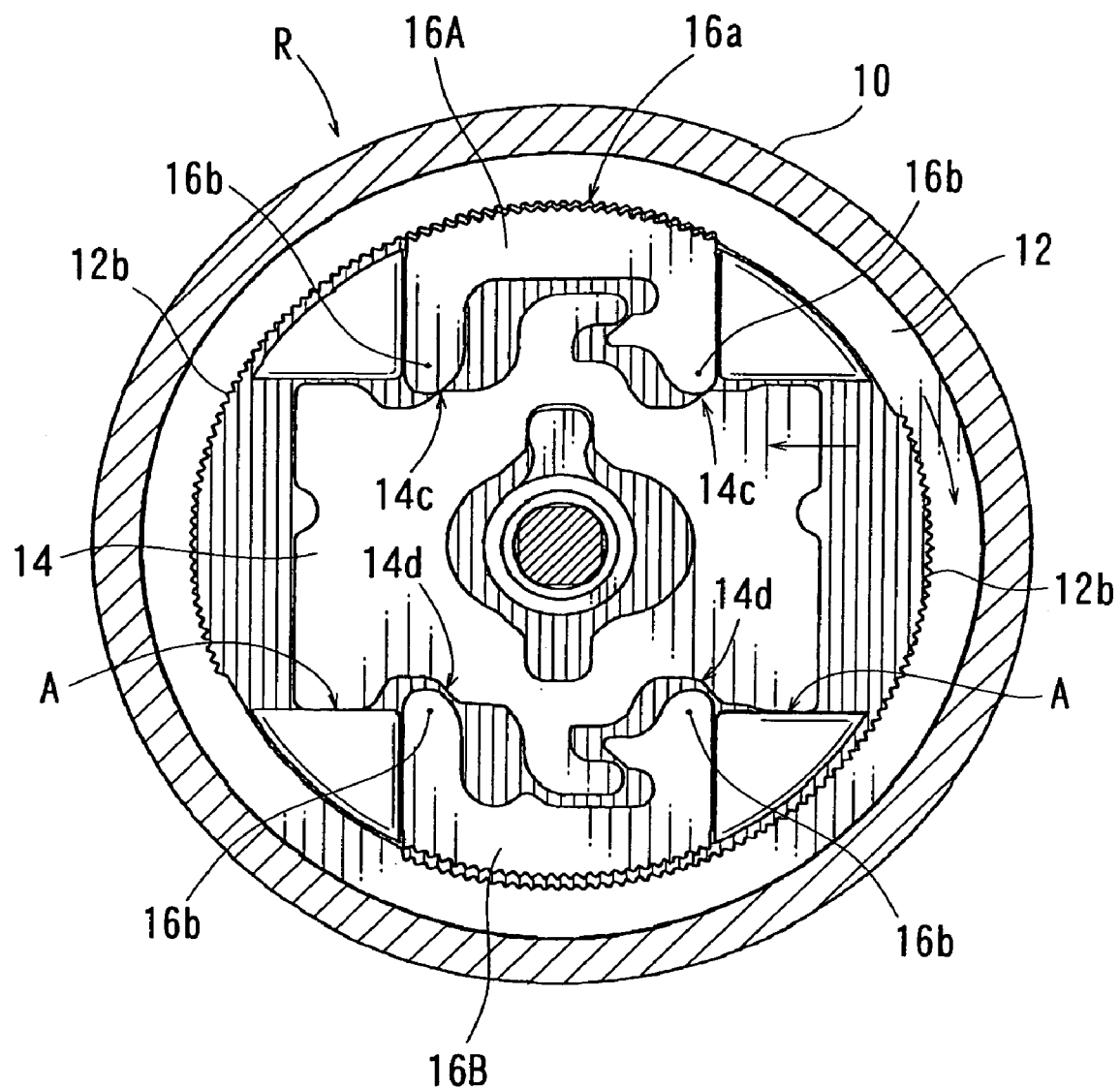
FIG. 4 is a plan view similar to FIG. 3, which illustrates a condition immediately before engagement of one of slide pawls.

When the back frame 28 is rotated relative to the cushion frame 26 in order to raise the seat back B shown in FIG. 1, for example, from a forwardly tilted position to a normal position, the rotational housing 12 rotates clockwise in the configuration shown in FIG. 3. Due to this rotation, as shown in FIG. 4, the ratchets 12*b* are shifted so as to be opposite to the toothed portions 16*a* of the slide pawls 16. At the same time, the operating cam 14 moves leftwardly by the force of the spring 24 so that the cam portions 14*c* push the contact portions 16*b* of the slide pawl 16A. Therefore, the operating cam 14 moves the slide pawl 16A radially outwardly by utilizing the wall surfaces A of the cam guide grooves 10*b* as supporting points. FIG. 4 illustrates a condition immediately before the toothed portion 16*a* of the slide pawl 16A engages the ratchet 12*b*. Further, in this condition, the cam portions 14*d* of the operating cam 14 are not still contacting the contact portions 16*b* of the slide pawl 16B, so that the slide pawl 16B is not moved.

Figure 5:
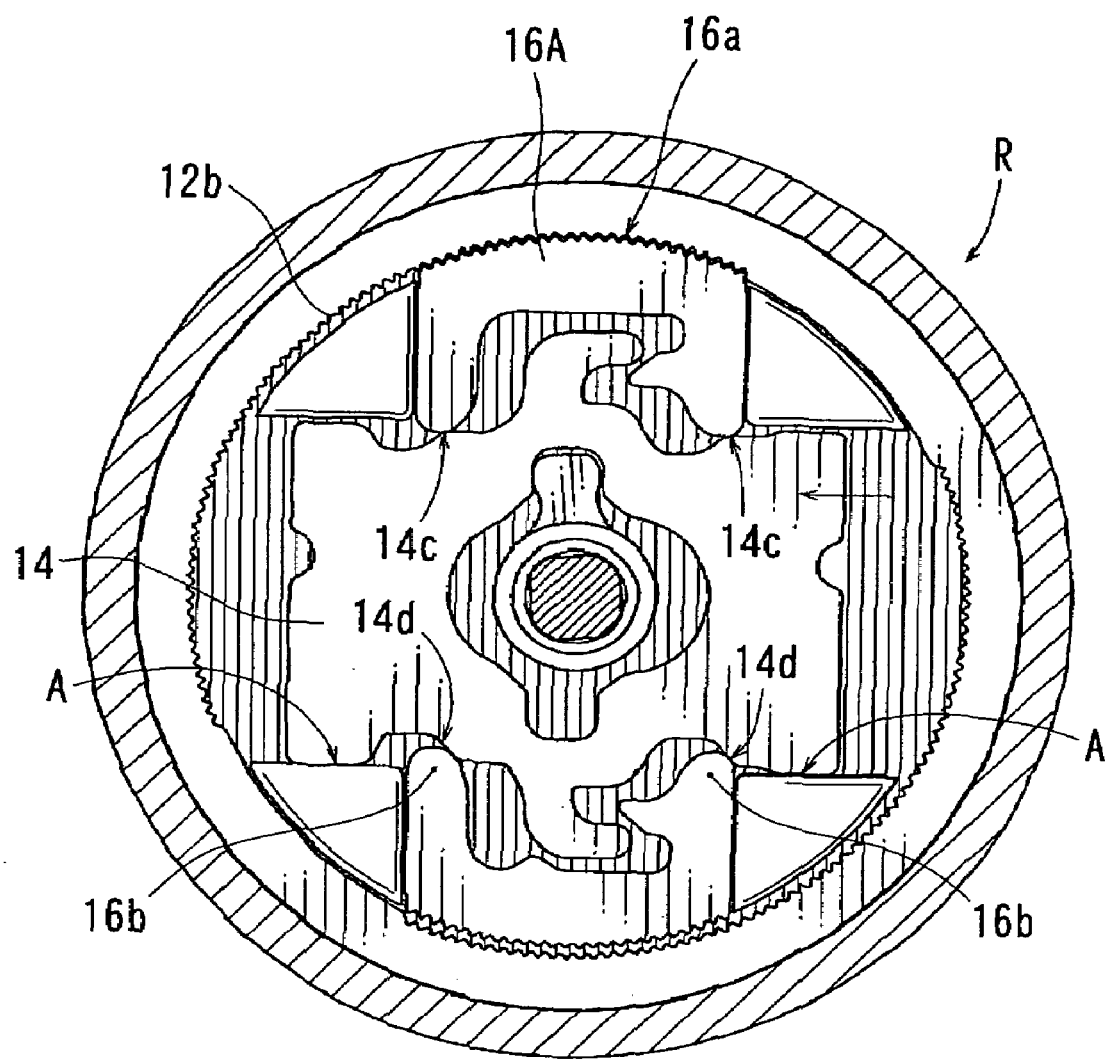
FIG. 5 is a plan view similar to FIG. 3, which illustrates a condition after substantial engagement of one of the slide pawls.

When the operating cam 14 is further moved leftwardly by receiving the force of the spring 24, as shown in FIG. 5, the operating cam 14 continuously moves the slide pawl 16A radially outwardly by utilizing the wall surfaces A as the supporting points. FIG. 5 illustrates a condition in which the toothed portion 16*a* of the slide pawl 16A engages the ratchet 12*b* over substantially half of their tooth depth. In this condition, the cam portions 14*d* of the operating cam 14 begin to contact the contact portions 16*b* of the slide pawl 16B.

Figure 6:
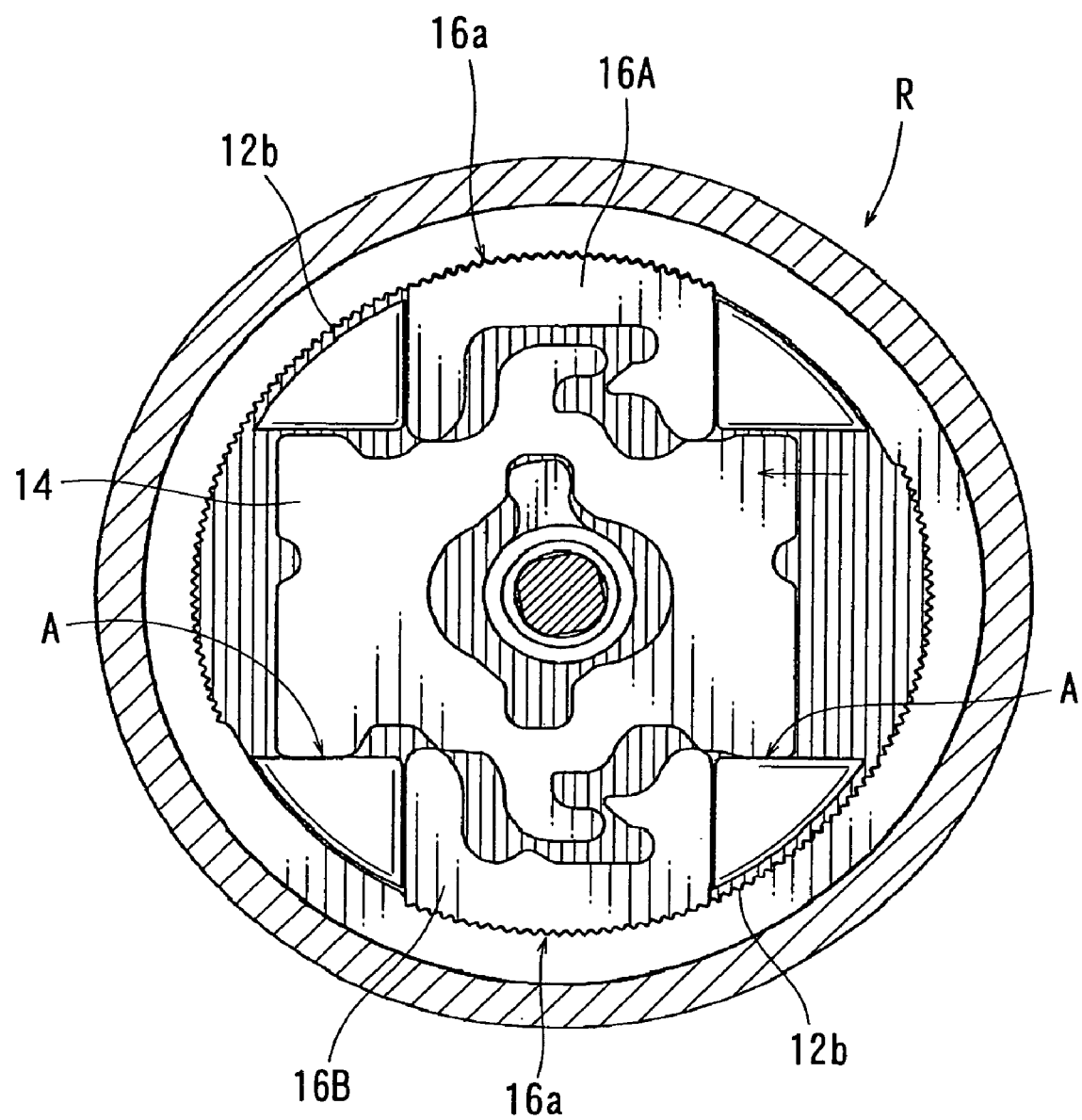
FIG. 6 is a plan view similar to FIG. 3, which illustrates a condition after complete engagement of the other of the slide pawls.

When the operating cam 14 is further moved leftwardly, the slide pawl 16B follows the slide pawl 16A so as to begin to move radially outwardly. And due to the difference of the shape of the cam portions 14*c* and 14*d*, as shown in FIG. 6, the toothed portion 16*a* of the slide pawl 16B completely engages the ratchet 12*b* just before the toothed portion 16*a* of the slide pawl 16A completely engages the ratchet 12*b*.

Figure 7:
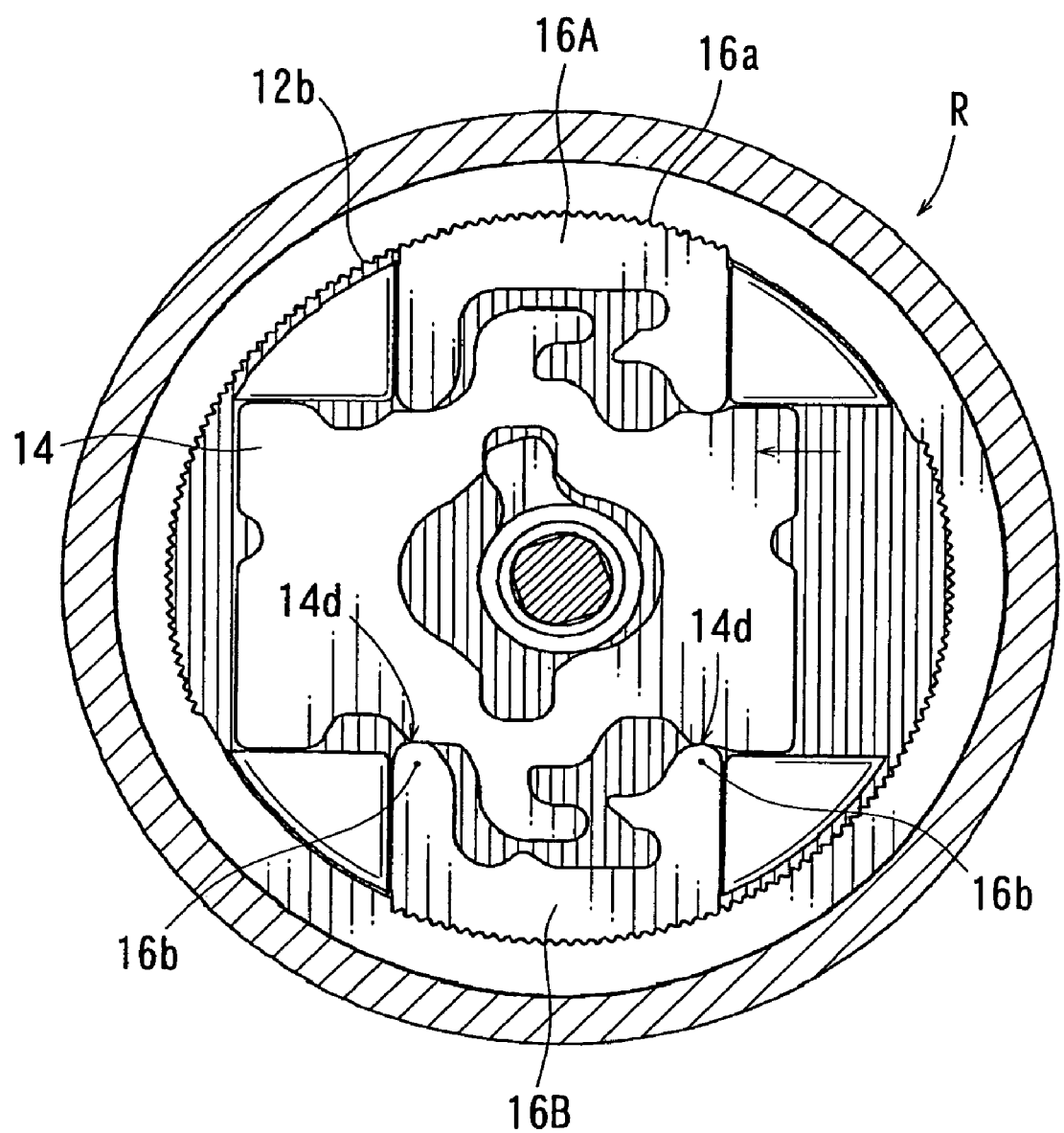
FIG. 7 is a plan view similar to FIG. 3, which illustrates a locking condition.

When the operating cam 14 is still further moved leftwardly, as shown in FIG. 7, the cam portions 14*d* run on the contact portions 16*b* of the slide pawl 16B. That is, after this condition, the supporting points of the operating cam 14 shift from the wall surfaces A of the cam guide grooves 10*b* to the contact portions 16*b* of the slide pawl 16B. Therefore, the operating cam 14 then moves the slide pawl 16A radially outwardly by utilizing the contact portions 16*b* as the supporting points so that the corresponding toothed portion 16*a* completely engages the ratchet 12*b*. Consequently, the reclining mechanism R is configured in a locking condition in which the relative rotation of the housings 10 and 12 is prevented. This locking condition can be maintained by the force of the spring 24.

Thus, when the slide pawls 16 are moved from their free positions to their locking positions in which they engage the ratchets 12*b*, if the slide pawl 16A completely engaged the ratchet 12*b* at the time shown in FIG. 5, the operating cam 14 could not be moved further leftwardly. This may preclude the engagement of the slide pawl 16B to the ratchet 12*b*. Consequently, the slide pawl 16B is constructed to completely engage the ratchet 12*b* before the slide pawl 16A (having the preceding movement start timing toward the locking position) completely engages the ratchet 12*b*. Further, the slide pawl 16A is constructed to finally completely engage the ratchet 12*b* so that the slide pawls 16A and 16B can appropriately engage the ratchets 12*b*.

In order to unlocking the reclining mechanism R, the operating shaft 22 and the operating member 20 are rotated clockwise against the force of the spring 24 by operating the operation lever 25. In synchronism with this operation, the operating cam 14 moves in the rightward direction in the drawings so that the engagement projections 14*a* and 14*b* respectively enter the engagement recesses 16*c* of the slide pawls 16. As a result, the slide pawls 16 are drawn back radially inwardly so that the respective toothed portions 16*a* are disengaged from the ratchets 12*b*, thereby permitting relative rotation of the housings 10 and 12.

Next, the second embodiment will be described with reference to FIG. 8.

Figure 8:
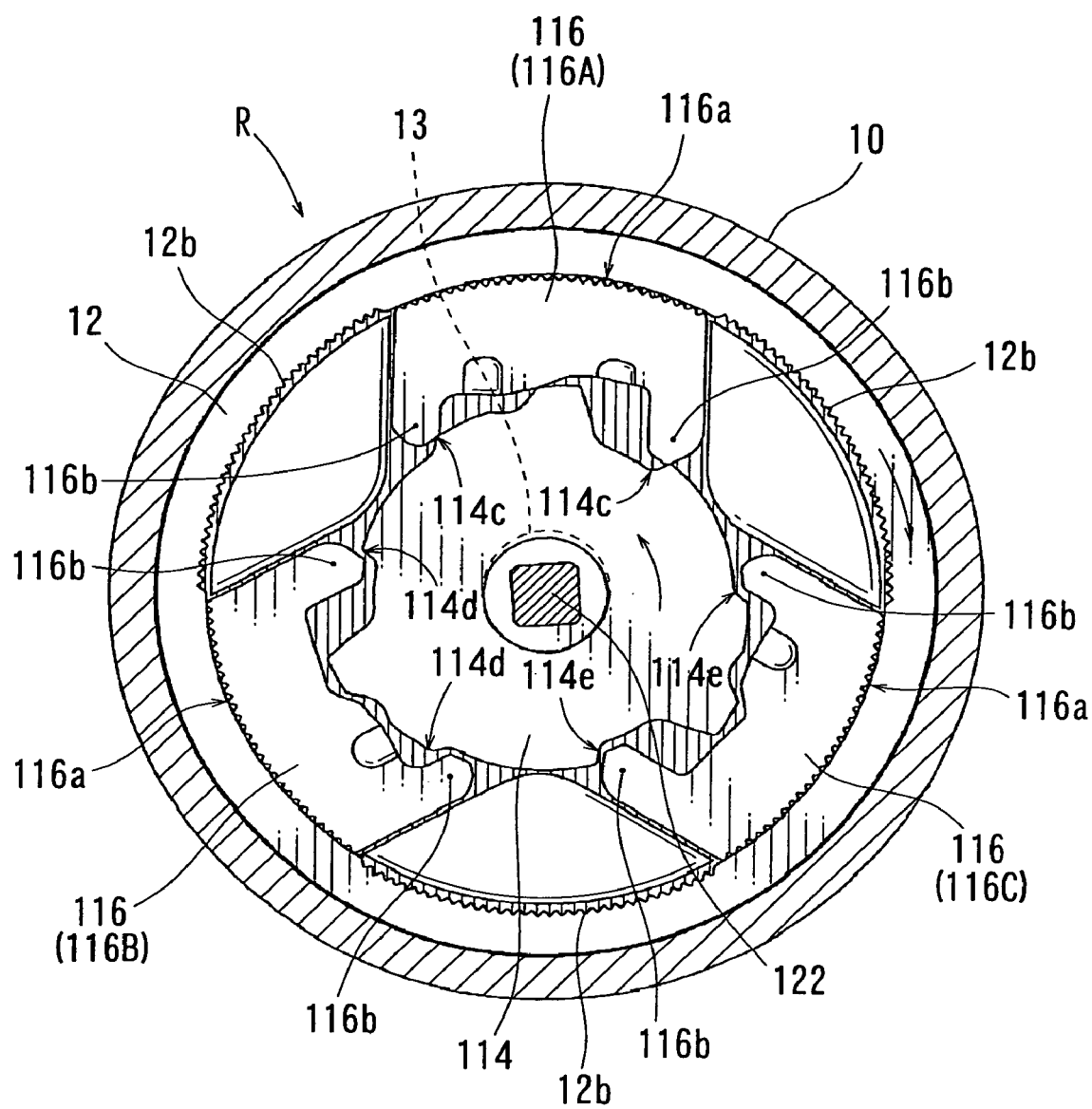
FIG. 8 is a plan view corresponding to FIG. 3, which illustrates a reclining mechanism according to a second embodiment.

FIG. 8 is a plan view corresponding to FIG. 3 and illustrates a reclining mechanism according to the second embodiment. As will be apparent from this drawing, in the second embodiment, the present invention is applied to a reclining mechanism R that includes a rotating-type operating cam and three slide pawls.

In FIG. 8, the circular plate-shaped operating cam 114 is positioned in the stationary housing 10 so as to rotate around an axis of an operating shaft 122. Also, the three slide pawls 116 (116A, 116B, 116C) are positioned in pawl guide grooves of the stationary housing 10 so as to radially slide without circumferentially moving. Each of cam portions 114*c*, 114*d* and 114*e* formed in an outer circumferential surface of the operating cam 114 are positioned so as to contact or to be contactable with contact portions 116*b* of each of the slide pawls 116. The operating cam 114 is rotatably supported about bearing openings 13 of the housings 10 and 12 and is biased in a counterclockwise direction in FIG. 8 by the force of a spring (not shown).

FIG. 8 shows an unlocking or free condition of the reclining mechanism R, i.e., a condition in which the housings 10 and 12 can rotate relative to each other. In this condition, the cam portions 114*c* of the operating cam 114 contact the contact portions 116*b* of the slide pawl 116A, thereby radially outwardly forcing the slide pawl 116A. As a result, similar to the first embodiment, the slide pawl 116A is radially restrictively positioned while its toothed portion 116*a* contacts the non-toothed portion of the housing 12. Therefore, the operating cam 114 is applied with a reactive force from the slide pawl 116A so as to be retained by a portion of the inner circumferential surfaces of the bearing openings 13. In other words, the operating cam 114 radially outwardly forces the slide pawl 116A by utilizing the inner circumferential surfaces of the bearing openings 13 as supporting points. Further, the cam portions 114*d* and 114*e* of the operating cam 114 are not contacting the contact portions 116*b* of the slide pawls 116B and 116C.

When the rotational housing 12 rotates clockwise in FIG. 8, as described in the first embodiment, the ratchets 12*b* are shifted so as to be opposite to the toothed portions 116*a* of the respective slide pawls 116. At the same time, the operating cam 114 rotates counterclockwise by the spring force so that the cam portions 114*c* push the contact portions 116*b* of the slide pawl 116A. Therefore, the operating cam 114 radially outwardly moves the slide pawl 116A by utilizing the inner circumferential surfaces of the bearing openings 13 as the supporting points. And when the toothed portion 116*a* of the slide pawl 116A engages the ratchet 12*b* over substantially half of their tooth depth, the cam portions 114*d* and 114*e* of the operating cam 114 contact the contact portions 116*b* of the slide pawls 116B and 116C.

When the operating cam 114 further rotates, the slide pawls 116B and 116C follow the slide pawl 116A so as to begin to move radially outwardly. And the toothed portions 116*a* of the slide pawls 116B and 116C completely engage the ratchets 12*b* just before the toothed portion 116*a* of the slide pawl 116A completely engages the ratchet 12*b*. Subsequently, upon rotation of the operating cam 114, the cam portions 114d and 114e run on the contact portions 116b of the slide pawls 116B and 116C. After this condition, the supporting points of the operating cam 114 shift from the inner circumferential surfaces of the bearing openings 13 to the contact portions 116b of the slide pawls 116B and 116C. Therefore, the operating cam 114 then radially outwardly moves the slide pawl 116A by utilizing the contact portions 116b as supporting points, so that the corresponding toothed portion 116a completely engages the ratchet 12b. Consequently, the reclining mechanism R is configured in a locking condition in which the relative rotation of the housings 10 and 12 is limited.

In order to unlock the reclining mechanism R in the second embodiment, the operating cam 144 is rotated clockwise against the spring force, together with the operating shaft 122. Due to the functions of a plate member (not shown) that integrally rotates with the operating cam 144, each of the slide pawls 116 moves radially inwardly so that the respective toothed portions 116a are disengaged from the ratchets 12b. Further, with regard to the reclining mechanism R shown in the second embodiment, four or more slide pawls may be used.

The first and second embodiments are described with regard to the reclining mechanism R in which the sliding-type pawls 16 and 116 are used. However, the reclining mechanism R may be a reclining mechanism having rotary pawls that are rotatable from a free position to a locking position. In addition, the first and second embodiments describe the case in which the movement start timing of at least one of the pawls precedes the movement start timing of the other of the pawls. However, it is possible to design an embodiment such that for example, the movement amount of a specific pawl precedes the movement amount of the other of the pawls without differentiating the movement start timings of the pawls.

As described above, when each of the slide pawls moves by the spring force from the free position wherein the relative rotation of the housings is permitted, to the locking position wherein the relative rotation of the housings is limited, in its initial state, the spring force can converge on one of the slide pawls. As a result, the engagement (locking) force between one of the slide pawls and the ratchet can be increased without increasing the spring force. Further, as previously described, for example, the other slide pawls can completely engage the corresponding ratchets 12b before the slide pawl having the preceding movement start timing completely engages the ratchet 12b. Due to this order of engagement, the operating cam may be prevented from being unable to rotate or slide so that all of the slide pawls can engage the ratchets 12b.

The preferred embodiments of the present invention are described. However, it should be understood that with regard to these embodiments, various changes and modifications can be easily performed without departing from the spirit of the present invention described in the attached claims.

The invention claimed is:

1. A reclining mechanism having a construction in which a plurality of pawls are received in a pair of housings that are relatively rotatably connected to each other, each of these pawls being prevented from rotating relative to one of said housings and being engageable with a ratchet formed in the other of said housings, each of said pawls being moved by a spring force from a free position in which the relative rotation of said housings is permitted, to a locking position in which the relative rotation of said housings is prevented by virtue of the engagement of each of the pawls and said ratchet, wherein at least one of the pawls is moved prior to the other of the pawls when each of said pawls moves from said free position to said locking position.

2. The reclining mechanism as defined in claim 1, wherein an operating cam that is operated by said spring force is received in the housings, and wherein a moving timing of each of the pawls is defined by the shape of cam portions of said operating cam.

3. A reclining mechanism having a construction in which a plurality of pawls and an operating cam are respectively received in a pair of housings that are relatively rotatably connected to each other, each of said pawls being prevented from rotating relative to one of said housings and having a toothed portion that is engageable with a ratchet formed in the other of the housings and a contact portion that is positioned opposite to the toothed portion, said operating cam having cam portions that can respectively separately interact with said contact portions of said respective pawls, said respective cam portions separately interacting with said contact portions of said respective pawls when the operating cam is operated by a predetermined spring force so that each of the pawls is moved from a free position in which the relative rotation of said housings is permitted to a locking position in which the relative rotation of said housings is prevented by virtue of engagement of said toothed portion of each of said pawls and said ratchet, wherein said respective cam portions of said operating cam are shaped such that at least one of the pawls is moved prior to the other of the pawls.

4. The reclining mechanism as defined in claim 3, wherein each of said cam portions of said operating cam is shaped such that when each of said pawls is moved from the free position to the locking position, the other of the pawls begin to move so as to engage the toothed portion with the ratchet before said toothed portion of one of the pawls completely engages the ratchet.

5. The reclining mechanism as defined in claim 3, wherein when one of the pawls first begins to move by operating said operating cam, a reactive force from one of said pawls is received by a guide member operationally guiding said operating cam, and wherein the other of the pawls begin to move before the completion of the movement of one of the pawls so that a reactive force from the other of the pawls is received by one of the pawls.

6. A reclining mechanism having a construction in which a plurality of slide pawls and an operating cam are respectively received in a pair of housings that are relatively rotatably connected to each other, each of said slide pawls being radially slidable while prevented from rotating relative to one of said housings and having a toothed portion that is engage able with a ratchet formed in the other of the housings and a contact portion that is positioned opposite to the toothed portion, said operating cam having cam portions that can respectively separately interact with said contact portions of said respective slide pawls, said respective cam portions separately interacting with said contact portions of said respective slide pawls when the operating cam is operated by a predetermined spring force so that each of the slide pawls is slid from a free position in which the relative rotation of said housings is permitted to a locking position in which the relative rotation of said housings is prevented by virtue of engagement of said toothed portion of each of said pawls and said ratchet, wherein said respective cam portions of said operating cam are shaped such that at least one of the slide pawls is moved prior to the other of the slide pawls.

7. The reclining mechanism as defined in claim 6, wherein said operating cam is a sliding-type cam, and wherein the movement of one of the slide pawls is performed by utilizing a contacting portion of a side surface opposite to said cam portion of said operating cam interacting with said slide pawl contact portion and a guide groove wall surface of said housing slidably guiding said operating cam as a supporting point.

8. The reclining mechanism as defined in claim 6, wherein said operating cam is a rotating-type cam, and wherein the movement of one of the slide pawls by utilizing a contacting portion of said operating cam and inner circumferential surfaces of bearing openings of said housings rotatably supporting the operating cam as a supporting point.

9. The reclining mechanism as defined in claim 6, wherein each of said cam portions of said operating cam is shaped such that when each of said slide pawls is moved from the free position to the locking position, the other of the pawls begin to move so as to engage the toothed portion with the ratchet before said toothed portion of one of the slide pawls completely engages the ratchet.

10. The reclining mechanism as defined in claim 6, wherein when one of the slide pawls first begins to move by operating said operating cam, a reactive force from one of said slide pawls is received by a guide member operationally guiding said operating cam, and wherein the other of the slide pawls begin to move before the completion of the movement of one of the slide pawls so that a reactive force from the other of the slide pawls is mutually received by the slide pawls.

11. A reclining mechanism having a construction in which a plurality of pawls and an operating cam are respectively received in a pair of housings that are relatively rotatably connected to each other, each of said pawls being prevented from rotating relative to one of said housings and having a toothed portion that is engageable with a ratchet formed in the other of the housings and a contact portion that is positioned opposite to the toothed portion, said operating cam having cam portions that can respectively separately interact with said contact portions of said respective pawls, said respective cam portions separately interacting with said contact portions of said respective pawls when the operating cam is operated by a predetermined spring force so that each of the pawls is moved from a free position in which the relative rotation of said housings is permitted, to a locking position in which the relative rotation of said housings is prevented by virtue of engagement of said toothed portion of each of said pawls and said ratchet, wherein said respective cam portions of said operating cam are shaped such that the movement start timing of one of the pawls precedes the movement start timing of the other of the pawls.

12. The reclining mechanism as defined in claim 11, wherein each of said cam portions of said operating cam is shaped such that when each of said pawls is moved from the free position to the locking position, the other of the pawls timely begin to move so as to engage the toothed portion with the ratchet before said toothed portion of one of the pawls completely engages the ratchet.

13. The reclining mechanism as defined in claim 11, wherein when one of the pawls first begins to move by operating said operating cam, a reactive force from one of said pawls is received by a guide member operationally guiding said operating cam, and wherein the other of the pawls begins to move before the completion of the movement of one of the pawls so that a reactive force from the other of the pawls is mutually received by the pawls.

14. A locking method of a reclining mechanism constructed such that in a pair of housings that are relatively rotatably connected to each other, a plurality of pawls provided in one of the housings are radially moved by operating an operating cam due to a predetermined spring force so as to engage a ratchet formed in the other of the housings, wherein when each of said pawls is moved by virtue of operation of said operating cam from a free position in which the relative rotation of said housings is permitted, to a locking position in which the relative rotation of said housings is prevented by virtue of the engagement of each of the pawls and said ratchet, said operating cam moves one of the pawls by utilizing a contacting portion of said operating cam and a guide member operationally guiding the operating cam as a supporting point, and wherein said operating cam acts on the other of the pawls before a toothed portion of one of the pawls completely engages the ratchet so that the other of the pawls begin to move toward the locking position in which a toothed portion engages the ratchet by utilizing a contacting portion of the operating cam and one of the pawls as the supporting point.

15. A reclining mechanism, comprising:

a first housing rotatably coupled to a fixed second housing, the first housing having toothed ratchet portions;

a plurality of pawls each having a contact portion and being movable between a free position in which the first housing is rotatable, and a locking position in which each of the pawls are engaged with the toothed ratchet portions such that the first housing is not rotatable; and an operating cam having a plurality of cam portions that correspond to and interact with the contact portions of the pawls, the operating cam being movable by a spring force, wherein one of the cam portions is shaped differently than the other cam portions such that one of the pawls is moved prior to the other of the pawls.

16. A reclining vehicle seat, comprising:

a base;

a seat back; and a reclining mechanism, the mechanism including:

a second housing coupled to the base;

a first housing coupled to the seat back, the first housing being rotatably coupled to the second housing such that the seat back is rotatable with respect to the base, the first housing having toothed ratchet portions;

a plurality of pawls each having a contact portion and being radially movable between a free position in which the first housing is rotatable, and a locking position in which each of the pawls are engaged with the toothed ratchet portions such that the first housing is not rotatable; and an operating cam having a plurality of cam portions that correspond to and interact with the contact portions of the pawls, the operating cam being movable by a spring force, wherein one of the cam portions is shaped differently than the other cam portions such that one of the pawls is moved prior to the other of the pawls.

17. A method of locking a reclining mechanism in a vehicle seat, the reclining mechanism comprising a first housing having toothed ratchet portions and being rotatably coupled to a fixed second housing, a plurality of moveable pawls within the first housing, and an operating cam having a plurality of cam portions that correspond to and interact with the pawls, the method comprising:

rotating the first housing with respect to the second housing, thereby aligning the toothed ratchet portions with the pawls;

moving the operating cam;

moving a first pawl toward a toothed ratchet portion in response to moving the operating cam;

moving a second pawl toward a toothed ratchet portion in response to moving the operating cam, the second pawl starting movement after the first pawl;

engaging the second pawl with a toothed ratchet portion of the first housing; and engaging the first pawl with a toothed ratchet portion of the first housing, the first pawl engaging the first housing after the second pawl.

* * * * *